United States Patent
Dang et al.

(10) Patent No.: US 11,816,777 B2
(45) Date of Patent: Nov. 14, 2023

(54) DATA PROCESSING SYSTEMS

(71) Applicant: Arm Limited, Cambridge (GB)

(72) Inventors: Maochang Dang, Shanghai (CN); Anton Berko, Shanghai (CN); Espen Amodt, Shanghai (CN)

(73) Assignee: Arm Limited, Cambridge (GB)

( * ) Notice: Subject to any disclaimer, the term of this patent is extended or adjusted under 35 U.S.C. 154(b) by 142 days.

(21) Appl. No.: 17/680,803

(22) Filed: Feb. 25, 2022

(65) Prior Publication Data
US 2023/0274488 A1 Aug. 31, 2023

(51) Int. Cl.
*G06T 15/00* (2011.01)
*G06T 1/20* (2006.01)

(52) U.S. Cl.
CPC .............. *G06T 15/005* (2013.01); *G06T 1/20* (2013.01)

(58) Field of Classification Search
CPC .................................. G06T 15/005; G06T 1/20
See application file for complete search history.

(56) References Cited

U.S. PATENT DOCUMENTS

2005/0223382 A1* 10/2005 Lippett ...................... G06F 9/50
718/103
2021/0117246 A1* 4/2021 Lal ......................... G06F 9/3814

* cited by examiner

*Primary Examiner* — Michelle Chin
(74) *Attorney, Agent, or Firm* — Vierra Magen Marcus LLP

(57) ABSTRACT

There is provided a data processing system comprising a host processor and a processing resource operable to perform processing operations for applications executing on the host processor by executing commands within an appropriate command stream. The host processor is configured to generate a command stream layout indicating a sequence of commands for the command stream that is then provided to the processing resource. Some commands require sensor data. The processing resource is configured to process the sensor data into command stream data for inclusion into the command stream in order to populate the command stream for execution.

17 Claims, 8 Drawing Sheets

DATA PROCESSING SYSTEMS

BACKGROUND

The technology described herein relates to data processing systems and in particular to the submission of processing tasks to a processing resource, such as a graphics processor, of a data processing system.

Many data processing systems include processing resources, such as a graphics processor (graphics processing unit (GPU)) that may perform processing tasks for, e.g., applications that are executing on a, e.g., main (e.g. host) processor (CPU) of the data processing system.

The processing resource, e.g. graphics processor, may be caused to perform processing tasks for applications by providing to the processing resource a stream of commands (instructions) to be executed by the processing resource. For example, a driver for the processing resource may prepare a command stream containing commands (instructions) to be performed by the processing resource, and provide the command stream to the processing resource (e.g. graphics processor), with the processing resource then performing the commands (the operations indicated by the commands) in the command stream.

The command stream may, for example, contain commands (instructions) to set parameters for processing tasks, as well as commands (instructions) to execute the processing tasks. The processing resource will then work its way through the command stream, executing the commands (instructions) in the command stream, e.g. in turn.

Thus, in the case of a graphics processing system, the graphics processing system will be configured to provide frames for display, and the command stream will correspondingly cause the graphics processor (graphics processing unit (GPU)) to render frames, at an appropriate rate.

An example of a use of a graphics processing system is to provide a virtual reality (VR) or augmented reality (AR) head mounted display (HMD) system. In this case, the display will be a head-mounted display of some kind.

In head mounted display operation, appropriate frames (images) to be displayed on each eye will be rendered by the graphics processor (graphics processing unit (GPU)) in response to appropriate commands and data from the application (e.g. executing on the main (e.g. host) processor (CPU)) that requires the display.

In such arrangements, the system will also operate to track the movement of the head/gaze of the user (so-called head pose (orientation) tracking). This head orientation (pose) data is then used to determine how the images should actually be displayed to the user for their current head position (view orientation (pose)), and the images (frames) are rendered accordingly (for example by setting the camera orientation (viewpoint and view direction) based on the head orientation data), so that an appropriate image (frame) based on the user's current direction of view can be displayed.

There are various other examples of external sensor data that may be used to determine the image (frame) to be displayed by a graphics processing system, both in the context of virtual reality (VR) or augmented reality (AR) head mounted display (HMD) systems, and also in the context of various other graphics processing systems. More generally, there are of course many possible examples of data processing system, whether they are graphics or non-graphics processing systems, that may use external sensor data when generating an output.

In command stream based systems, where processing resource, e.g. graphics processor (graphics processing unit (GPU)), may be caused to perform processing tasks for applications by providing to the processing resource a stream of commands (instructions) to be executed by the processing resource, such sensor data is typically obtained from one or more corresponding sensors associated with the data processing system, and then processed accordingly by the, e.g., main (e.g. host) processor (CPU) of the data processing system to generate appropriate commands for the processing resource, e.g. graphics processor (graphics processing unit (GPU)).

The Applicants however believe that there remains scope for improvements to the submission of processing tasks for execution to a processing resource, such as a graphics processor, of a data processing system, and in particular to improved methods of processing external sensor data in the context of command stream based data processing systems.

BRIEF DESCRIPTION OF DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
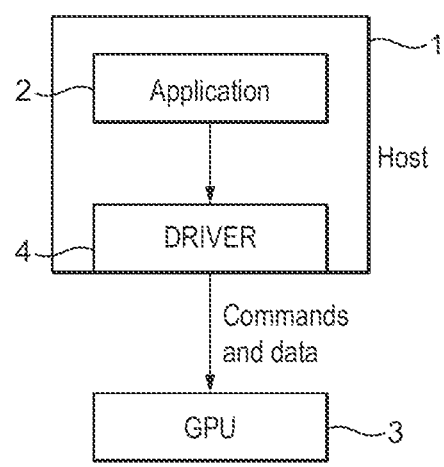
FIG. 1 shows an exemplary graphics processing system.

A first embodiment of the technology described herein comprises a method of operating a data processing system that comprises:
 a host processor operable to execute applications of the data processing system; and
 a processing resource operable to perform processing tasks for applications executing on the host processor;
the method comprising:
 preparing on the host processor, in response to a request for data processing to be performed by the processing resource from an application, a command stream layout indicating a sequence of commands for a command stream to cause the processing resource to perform processing tasks for the application, wherein for at least some of the commands indicated in the command stream layout, sensor data is required in order to populate the command for execution;
 the host processor providing the command stream layout to the processing resource; and
 the processing resource storing a command stream corresponding to the command stream layout within a command stream buffer for execution, wherein the processing resource storing a command stream corresponding to the command stream layout within the command stream buffer further comprises:
in response to a command indicated in the command stream layout requiring sensor data:
the processing resource:
processing the sensor data into command stream data for inclusion into the command stream; and
writing the command stream data into the command stream in the command stream buffer for execution by the processing resource;
the method further comprising:
the processing resource executing commands from within the command stream stored in the command stream buffer to perform processing tasks for the application.

A second embodiment of the technology described herein comprises a data processing system that comprises:
a host processor operable to execute applications of the data processing system; and
a processing resource operable to perform data processing tasks for applications executing on the host processor;
wherein the host processor comprises:
a command stream preparation circuit that is configured to prepare, in response to a request for data processing to be performed by the processing resource from an application, a command stream layout indicating a sequence of commands for a command stream to cause the processing resource to perform processing tasks for the application, wherein for at least some of the commands indicated in the command stream layout, sensor data is required in order to populate the command for execution; and
a processing circuit configured to provide prepared command stream layouts to the processing resource; and
wherein the processing resource comprises:
a command stream buffer for storing command streams corresponding to the command stream layouts provided by the host processor for execution;
a command stream execution circuit configured to execute commands from within the command stream buffer to perform processing tasks for the application; and
a processing circuit configured to, when storing a command stream corresponding to a command stream layout provided by the host processor in the command stream buffer for execution,
in response to a command indicated in the command stream layout requiring sensor data:
process the obtained sensor data into command stream data for inclusion into the command stream for execution; and
write the command stream data into the command stream in the command stream buffer for execution by the command stream execution circuit.

The technology described herein relates to arrangements in which a processing resource, such as a graphics processor, is operable to execute commands (instructions) in a command stream to perform processing tasks for applications executing on a host processor.

The technology described herein in particular relates to the situation where input (data) from external sensors is used when performing the processing tasks. In that case, the commands (instructions) in the command stream may, e.g., contain arguments or parameters that are set based on the external sensor data. Sensor data from one or more sensors is thus required in order to assemble the commands in the command stream for execution.

The data processing system of the technology described herein thus in an embodiment includes a sensing circuit that is operable to obtain sensor data from one or more (and in an embodiment a plurality of) sensors that are associated with the data processing system but that are external to the processing resource. These sensors may be any suitable sensors, as desired, e.g. depending on the data processing system and application in question. For example, the sensors may be associated with a user of the application executing on the host processor, or the local environment of the user.

Sensor data from one or more sensors associated with the data processing system may thus be required as input for the command stream generation process for generating the actual commands (instructions) within the command stream that is to be executed to cause the processing resource to perform a processing task.

According to the technology described herein, sensor data can be (and at least some sensor data is) provided (e.g. directly from a suitable sensing circuit that is operable to obtain sensor data from one or more sensors, e.g. without being processed by the host processor) to the processing resource (e.g. graphics processor) and is then processed by the processing resource itself, at run-time, in order to assemble the commands in the command stream for execution by the processing resource.

That is, in the technology described herein, rather than performing the full command stream assembly on the host processor, as would be done in more traditional arrangements, at least part of the final command stream assembly, namely the obtaining and processing of the sensor data into suitable command stream data, is performed by the processing resource itself.

The present Applicants have found that this approach, where the sensor data is obtained and processed into command stream data by the processing resource, can provide an overall more efficient, e.g., and in an embodiment, lower latency, arrangement for the submission of processing tasks for execution to a processing resource of a data processing system.

For instance, in more traditional arrangements, the command stream would be prepared and assembled in full by the host processor (e.g. by a driver for the processing resource) and then provided to the processing resource for execution. This is because the processing resource traditionally does not have enough knowledge of the application to assemble the command streams itself at run-time.

In more traditional arrangements, the processing resource thus simply works through the command stream prepared by the host processor in order to perform the processing tasks. This means that when new sensor data is acquired, this is first obtained by the host processor, and then used to update or generate a new command stream for the processing resource that is then provided to the processing resource for execution.

The present Applicants recognise however that attempting to prepare the command streams in full at the host processor, as is done in more traditional arrangements, can introduce significant latency, as well as requiring a higher host processor processing load, and higher bandwidth for transferring data for the command stream assembly to/from the processing resource. For instance, where the sensor data is obtained by the host processor and updated or new command streams prepared accordingly this means there can be significant latency issues. The Applicants have further recognised it may be better, at least for applications where lower latency is desired, for the sensor data to be obtained and processed closer to run-time.

Such traditional arrangements may therefore be less suitable for applications that require lower latency, which is the case for many modern processing applications, such as graphics processing for gaming or VR/AR applications, where a near to real-time display is desired.

In contrast, in the technology described herein, by performing at least some of the command stream assembly, including (but not limited to) the obtaining and processing of such external sensor data, at the processing resource itself during run-time, the technology described herein can provide an overall more efficient, e.g. lower latency, arrangement.

The technology described herein thus provides a more efficient approach for assembling command streams for a processing resource of a data processing system, e.g., and in an embodiment, with reduced latency. The technology described herein may therefore be particularly suited for applications where lower latency is desired.

For instance, the Applicants have recognised that in many cases, it is known in advance when sensor data may be required (e.g. since a certain operation always takes sensor data as input). Thus, a command can be indicated within a pre-prepared command stream layout that requires sensor data but the actual steps of obtaining and processing the sensor data into suitable command stream data (e.g. commands) can be deferred and performed by the processing resource, at run-time. This then reduces latency associated with generating the command stream, and thus also means that the obtained sensor data is more current.

That is, rather than the sensor data being obtained and processed by the host processor, and the commands (instructions) in the command streams being prepared and populated accordingly by the host processor, as may be the case in more traditional arrangements, in the technology described herein, the processing resource, e.g. graphics processor, is caused to obtain and process the sensor data into suitable command stream data for inclusion into the command stream itself, such that the final command stream assembly is performed by the processing resource, at run-time.

To achieve this, the host processor needs to be able to communicate to the processing resource to cause (trigger) the processing resource to obtain and process sensor data into suitable command stream data (commands) in this way, as and when required.

The triggering of this command stream generation work (i.e. including the obtaining and processing of sensor data into command stream data) at the processing resource can be done in various ways, as desired.

In embodiments, this is done by the host processor, when preparing the command stream layout, also generating one or more indicators of command stream generation work that is to be performed by the processing resource to populate the command stream corresponding to the command stream layout, which indicators will trigger the processing resource to perform command stream generation work to generate command stream data for inclusion into the command stream corresponding to the command stream layout for execution.

In response to such indicators, the host processor is then caused (triggered) to perform the indicated command stream generation work to generate command stream data for inclusion into the command stream; and write the generated command stream data into the command stream in the command stream buffer for execution by the processing resource.

Thus, in the technology described herein, suitable indicators may be generated at the host processor and provided to the processing resource to cause (trigger) the processing resource to perform command stream generation work including obtaining sensor data, and processing the sensor data into suitable command stream data for inclusion into the command stream. In this way, the overall command stream preparation, including the overall layout and order of the commands within the command stream, is still controlled by the host processor, such that the sequence of commands in the command stream is determined by the host processor, e.g. based on the application's processing requirements (which are not known as such by the processing resource). However, the command stream (layout) that is prepared by the host processor and provided to the processing resource is not a complete command stream (e.g. it is not ready for immediate execution) and at least some of the command stream data in the final, assembled command stream (the command stream that is executed by the processing resource) is generated by the processing resource itself.

The command stream layout and indicators of command stream generation work may take any suitable form, as desired.

For example, in an embodiment, the indicator that command stream generation work is to be performed by the processing resource is provided in the form of a bitwise mask that is provided to the processing resource, and whose bit values are set accordingly to indicate certain (pre-set) command stream generation tasks to be performed.

Thus, a first bit value in the bitwise mask, when set, may cause the processing resource to obtain and process sensor data of a first type when the bitwise mask is provided to the processing resource. Correspondingly, a second bit value in the bitwise mask, when set, may cause the processing resource to obtain and process sensor data of a second type, and so on.

That is, the processing resource may be configured to perform a number of pre-set command stream generation tasks, and the bitwise mask can indicate which of these (pre-set) tasks should be performed.

The indicator(s) (e.g. bitwise mask) can be provided to the processing resource in any suitable and desired manner.

For instance, in embodiments, the indicator(s) (e.g. bitwise mask) may be provided as part of the overall command stream layout. In other embodiments, the indicator(s) (e.g. bitwise mask) may be provided separately and in addition to the command stream layout, e.g. as side channel information, directly to a suitable processor of the processing resource.

In order to correctly assemble the commands in the full command stream, the host processor also needs to indicate to the processing resource the position at which the resulting command stream data (commands) should be included in the final command stream (for execution).

This can be done in various ways as desired. For instance, this could be done implicitly using the position of the indicator(s) (e.g. bitwise mask) within the overall command stream (layout). In that case, the (e.g.) bitwise mask may be associated with a command that is indicated in the command stream, and the bitwise mask may indicate which types of command stream generation work should be performed for that command (e.g., and in an embodiment, which sensor data is required to populate the command for execution). The processing resource can thus use the bitwise mask to identify the command stream generation work that is required, and then perform the command stream generation work accordingly to populate the associated command with command stream data for execution.

In another example, the indicator (e.g. bitwise mask) may indicate which commands in the sequence of commands indicated by the command stream layout require sensor data (i.e. which commands need to be populated with command stream data generated by the processing resource). In that case, the bitwise mask may explicitly indicate which commands within the command stream layout are to be populated by the processing resource, e.g. with the different bit values corresponding to different commands within the sequence of commands indicated by the command stream layout (e.g. so that the first bit value, if set, means that the first command needs to be populated by the processing resource, and so on).

However, various other arrangements would be possible, and the indicators that trigger the processing resource to perform command stream generation work (obtaining/processing the sensor data) may be more or less complex, as desired. For example, the indicators may in other embodiments comprise a command "template" (or "token") that includes all of the information (e.g. a command type, descriptors of state, data, etc., to be used) necessary for the processing resource to generate an executable command. In that case, a separate and additional descriptor of the command stream layout may also be provided indicating which of the commands in the command stream are command "templates" ("tokens") that need to be populated by the processing resource.

Other arrangements would of course be possible.

Thus, the method in an embodiment comprises: the host processor providing the command stream layout and the indicators of command stream processing work to the processing resource; and in response to an indication of command stream processing work that is to be performed by the processing resource: the processing resource obtaining sensor data from the one or more sensors and processing the obtained sensor data to generate command stream data for inclusion into the command stream.

The processing resource is thus in an embodiment caused to check for new sensor data in response to the indicators provided by the host processor, e.g. based on pre-knowledge that the commands in the command stream layout will require sensor data. That is, in embodiments, the operation of checking/obtaining new sensor data is driven by the application's requirements, e.g. such that sensor data is obtained periodically, in response to a command being indicated in the command stream layout that requires sensor data to be obtained and processed into command stream data to populate the full command for execution (e.g. rather than checking the sensors in response to the sensor firing, i.e. new sensor data being available).

However, it would also be possible for the operation of checking/obtaining for new sensor data to be initiated by the sensors. For example, if a sensor fires, indicating that there is new sensor data, this information may be communicated back to the host processor to cause the host processor to generate a new command stream layout for a new command stream, together with suitable indicators, as described above, to cause the processing resource to obtain the new sensor data.

Various arrangements would be possible in this regard.

The processing resource obtaining sensor data may thus comprise the processing resource checking for new sensor data (e.g. of a specified type). If there is no new sensor data, the processing resource may re-use the previous values for the sensor data (and in an embodiment also the previous processing results of that sensor data) to generate the corresponding command stream data for inclusion into the command stream. On the other hand, where new sensor data is present, this is obtained and processed accordingly into command stream data.

The actual command stream generation work itself, i.e. the processing of the obtained sensor data into command stream data, can be performed by the processing resource in any suitable fashion.

For example, this may be performed by a dedicated (e.g. hardware) circuit that is provided for this purpose, or could be another processing circuit (processor) that is re-purposed for command stream generation work, as desired.

In an embodiment, the command stream generation work is performed under the control of a supervisor (controller) that manages the command stream operation. Thus, in embodiments, the command stream generation work may be performed by the supervisor (controller), or by the supervisor (controller) triggering another processing circuit (processor) within the processing resource to perform the command stream generation work.

In that case, the processing circuit (processor) that performs the command stream generation work may be any suitable processing circuit (processor). Thus, this could be a dedicated (e.g. hardware) circuit that is provided for this purpose, or could be another processing circuit (processor) that is re-purposed for command stream generation work, as desired.

In the case of a graphics processor, for example, the command stream generation work could be performed by executing an appropriate compute shader program. For instance, where the processing resource is a graphics processor, the processing resource may (and in an embodiment does) comprise a programmable execution unit (a shader core) that is operable to execute shader programs. In response to an indicator that command stream generation work is to be performed, the command stream supervisor (controller) may thus be configured to cause the programmable execution unit to execute an appropriate shader program to perform the command stream generation work.

Thus, in embodiments, the steps of obtaining and processing the sensor data may comprise the processing resource executing an appropriate (shader) program that checks the current sensor data and then processes it accordingly into command stream data.

In that case, the processing resource (graphics processor) may store a number of pre-set shader programs that can be executed as required to process sensor data (or particular types of sensor data) into command stream data.

Thus, in response to the processing resource obtaining new sensor data of a particular type, the processing resource can then trigger an appropriate pre-set shader program to process the sensor data into command stream data. These pre-set programs can thus be used and re-used to populate different (types of) commands. Correspondingly, as mentioned above, if there is no new sensor data, the processing resource can simply re-use a processing result for the previous sensor data. Indeed a benefit of the approach according to the technology described herein is that it is possible to re-use resources and data when preparing different commands.

The sensor data may be provided to the processing resource in any suitable and desired manner. For example, the sensor data may be provided to the processing resource using any suitable interface of the processing resource. In an embodiment, the sensor data is provided along the same interconnect that is used for communications between the host processor and processing resource.

As mentioned above, the sensor data may be any type of sensor data that may suitably be used by the application executing on the data processing system. The sensors may correspondingly comprise any suitable form of sensor that can provide the desired sensor data. The sensors are in an embodiment external to the processing resource. In embodiments, the sensor data (and sensors) is associated with a user of the application.

For example, in the case of a graphics processing system, an application such as a game, or a virtual/augmented reality (VR/AR) application, executing on the host processor may require the display of frames with the content of the frames often (and typically) depending on user or sensor input. For instance, in VR/AR applications, the display is typically (and in an embodiment) based on the user's current field of vision. A head-mounted VR/AR system will thus typically (and in an embodiment) contain various sensors for tracking the user's head position, gaze, etc., which information is then used accordingly when generating the display.

Thus, in embodiments, the data processing system is a head mounted display system. In embodiments, the (virtual reality (VR) and/or augmented reality (AR)) head mounted display system may include one or more sensors for sensing (tracking) the orientation (pose) (e.g. rotations and/or translations) of the user's head (and/or their view (gaze) direction) in use (while images are being displayed to the user on the head mounted display of the (virtual reality (VR) and/or augmented reality (AR)) head mounted display system).

However, various other types of sensor data may be used, as desired, e.g. depending on the application's requirements.

For example, an application may also use input from motion or rotation sensors, gravity sensors, touch sensors, etc., as desired. Furthermore, as well as sensor data relating to a user of the application, the sensor data could also relate to the local environment of the user (and/or data processing system). In that case, for example, an ambient lighting sensor may be used to determine a display that is generated.

Various other arrangements would be possible.

According to the technology described herein, therefore, the host processor is arranged to generate a command stream layout indicating a sequence of commands for a command stream, which is then provided to the processing resource accordingly.

However, there are at least some commands indicated in the command stream layout that require sensor data, and according to the technology described herein, the processing resource is caused to perform the final assembly of the command stream including the obtaining and processing of the sensor data in order to populate the command stream for execution.

This can therefore provide an overall improved, e.g. more efficient (lower latency), arrangement for the submission of processing tasks for execution to a processing resource.

Furthermore, the operation and command stream preparation and processing task execution in the manner of the technology described herein can be achieved without the need for significant main (host) processor overhead, and without, for example, requiring significantly more sophisticated driver operation for the processing resource.

The technology described herein may therefore provide various benefits compared to other approaches.

The commands (instructions) within the (fully assembled) command stream can then be (and are) executed from within the command stream buffer to cause the processing resource to perform data processing tasks, e.g. in the normal manner.

That is, once the command stream has been suitably assembled for execution in the manner described above, the command stream can then be executed, e.g. as normal.

The technology described herein also extends to the operation of preparing the command streams per se, and, correspondingly, to the processing resource executing the command streams per se.

Thus, a further embodiment of the technology described herein comprises a method of operating a host processor of a data processing system that comprises a host processor operable to execute applications of the data processing system, and a processing resource operable to perform processing tasks for applications executing on the host processor;

the method comprising:
preparing on the host processor, in response to a request for data processing to be performed by the processing resource from an application, a command stream layout indicating a sequence of commands for a command stream to cause the processing resource to perform processing tasks for the application, wherein for at least some of the commands indicated in the command stream layout, sensor data is required in order to populate the command, the host processor also generating indicators of command stream generation work to be performed by the processing resource to cause the processing resource to obtain and process sensor data in order to populate the commands;
the host processor providing the command stream layout and corresponding indicators of command stream generation work to the processing resource.

A further embodiment of the technology described herein comprises a host processor for a data processing system, the data processing system comprising the host processor, and a processing resource, the host processor operable to execute applications of the data processing system, and comprising:
a command stream preparation circuit that is configured to prepare, in response to a request for data processing to be performed by the processing resource from an application, a command stream layout indicating a sequence of commands for a command stream to cause the processing resource to perform processing tasks for the application, wherein for at least some of the commands indicated in the command stream layout, sensor data is required in order to populate the command, the host processor also generating indicators of command stream generation work to be performed by the processing resource to cause the processing resource to obtain and process sensor data in order to populate the commands; and
a processing circuit configured to provide prepared command stream layouts and corresponding indicators of command stream generation work to the processing resource.

In these embodiments, the host processor is thus further configured, when preparing a command stream layout, to also generate indicators of command stream processing work to be performed by the processing resource, which indicators will cause the processing resource to generate command stream data to populate commands indicated in the command stream layout, in particular by obtaining sensor data (e.g. from a sensing circuit associated with one or more sensors) and then processing the sensor data into appropriate command stream data for populating a command, e.g. in the manner described above.

A further embodiment of the technology described herein comprises a method of operating a processing resource of a data processing system, the processing resource being operable to perform processing tasks for applications executing on a host processor of the data processing system;

the method comprising:
the processing resource receiving a command stream layout indicating a sequence of commands for a command stream to cause the processing resource to perform processing tasks;
the processing resource storing a command stream corresponding to the command stream layout within a command stream buffer for execution,
wherein for at least some of the commands indicated in the command stream layout, sensor data is required in order to populate the command, and wherein the processing resource storing a command stream corresponding to the command stream layout within the command stream buffer further comprises:
in response to a command indicated in the command stream layout requiring sensor data:
the processing resource:
processing the sensor data into command stream data for inclusion into the command stream; and
writing the command stream data into the command stream in
the command stream buffer for execution;
the method further comprising:
the processing resource executing commands from within the command stream stored in the command stream buffer to perform the processing tasks to which the command stream relates.

A further embodiment of the technology described herein comprises a processing resource for a data processing system, the data processing system comprising a host processor, and the processing resource, wherein the processing resource is operable to perform processing tasks for applications executing on a host processor of the data processing system, and comprises:
a command stream buffer for storing command streams corresponding to the command stream layouts received by the processing resource;
a command stream execution circuit configured to execute commands from within the command stream buffer to perform processing tasks; and
a processing circuit configured to, when storing a command stream corresponding to a command stream layout received by the processing resource in the command stream buffer,
in response to a command indicated in the command stream layout requiring sensor data:
process the sensor data into command stream data for inclusion into the command stream; and
write the command stream data into the command stream in the command stream buffer for execution by the command stream execution circuit.

The technology described herein according to these further embodiments may have any and all of the features described above in relation to the first and second embodiments, at least to the extent they are not mutually exclusive. That is, the host processor and processing resource according to these further embodiments may have any optional features described in relation to the host processor and processing resource of the earlier embodiments, and may be operated in the same fashion.

The processing resource can be any suitable processing resource that is operable to perform processing tasks for applications.

In an embodiment, the processing resource is a graphics processor (a graphics processing unit (GPU)). Thus, in embodiments, the processing resource (graphics processor) is operable to perform graphics processing tasks for applications executing on the host processor (and is additionally configured to perform command stream generation work in the manner described above). In that case, the command stream generation work in an embodiment generates executable commands for storing in the command stream buffer that when executed by the graphics processor will cause the graphics processor to perform a graphics processing task.

The technology described herein is particularly suited for graphics processing applications as these often desire lower latencies. For example, this is particularly the case for real-time rendering for gaming and VR/AR applications.

However, the technology described herein can equally be applied to other suitable data processing systems where a host processor prepares command streams for a processing resource and where lower latencies are desired.

The processing that is to be performed by the processing resource can be any suitable and desired processing that the processing resource in question can perform. This may, and in an embodiment does, accordingly depend upon the nature of the processing resource.

In the case of a graphics processor, the processing to be performed in an embodiment comprises appropriate graphics processing, such as generating graphics processing outputs, such as rendering frame (images) for display and/or for other purposes (e.g. render to texture operations).

The data processing tasks that are to be performed by the processing resource for the application can be any suitable and desired processing tasks that the processing resource in question can perform. They may, and in an embodiment do, accordingly depend upon the nature of the processing resource, and on the particular processing that is to be performed by the processing resource.

In the case of a graphics processor, the processing tasks in an embodiment comprise appropriate graphics processing operations, such as for generating graphics processing outputs, such as rendering frames (images) for display and/or for other purposes (e.g. render to texture operations).

Any desired number of command streams (or command stream layouts) can be prepared for the processing resource. In some embodiments a plurality of (e.g. two) command streams are executed by the processing resource, with a corresponding plurality of command stream layouts thus being prepared by the host processor, but in other embodiments there may only be a single command stream. The or each command stream may relate to any suitable and desired processing tasks.

The or each command stream should, and in an embodiment does, include one or more, and in an embodiment plural, commands (instructions). The or each command stream can include any suitable and desired commands (instructions) to cause the processing resource to perform the desired processing tasks, e.g., and in an embodiment, in accordance with the command stream operation of the data processing system and processing resource in question. Thus the command stream in an embodiment can, and in an embodiment does, include one or more or all of: commands (instructions) to set parameters for processing tasks, commands (instructions) to execute the processing tasks, commands (instructions) to wait for the completion of a processing task, etc.

Where there are a plurality of (e.g. two) commands streams, the command streams can also include wait commands that cause the execution of one command stream to wait pending the execution of the (or an) other command stream. An example of this mechanism is described in U.S. Pat. No. 10,861,125 (Arm Limited), the contents of which are incorporated herein entirely, and which may be applied also to the command streams of the technology described herein.

The host processor can prepare the command stream (layout) for the processing resource in response to a request for processing to be performed by the processing resource from an application in any suitable and desired manner. In an embodiment the host processor adds respective commands (and/or, e.g., command "templates" as described above), to a respective command stream (layout) to cause the processing resource to perform the desired processing tasks. The host processor should add commands to a given command stream appropriately, e.g., in dependence upon the processing tasks required, as discussed above. For example, where there are plural command streams, the processor may add commands for a particular type or types of processing task to one command stream, and commands for a different type or types of processing task to another command stream.

For example, in the case of a graphics processor, in an embodiment, the host processor will prepare one command stream (layout) that includes a sequence of commands to cause the graphics processor to perform geometry tasks (jobs), and another command stream (layout) including a sequence of commands to cause the graphics processor to perform compute tasks (compute jobs), in an embodiment compute jobs that are to perform tessellation operations.

In an embodiment, the host processor is operable, as it is preparing the command streams, to, for a (and for each) command stream that is being prepared, track the current position that has been reached in the command stream (i.e. the latest command added to the command stream). This is in an embodiment done by maintaining a progress counter that tracks how many commands (or at least commands of a particular type or types) have been included in the command stream. Thus the host processor in an embodiment increments a progress counter as it adds, e.g. particular, commands to a command stream (and in an embodiment does this for each command stream that it is preparing).

Thus, in an embodiment, the host processor will progressively add commands, or command "templates", etc., to a (and to each) command stream (layout) for causing the processing resource to perform desired processing tasks for an application, and while doing so, for each command stream (layout), keep track of the current position in the command stream that has been reached (in an embodiment by maintaining a progress counter value for the command stream). Thus when an appropriate command (template) is added to a command stream layout, the host processor will also appropriately increment a progress counter value for the command stream corresponding to the command stream layout, so as to keep track of the current position that has been reached in that command stream.

The preparation of the command streams (or command stream layouts) by the host processor can be performed by any suitable and desired element and component of the host processor. In an embodiment, a driver for the processing resource in question prepares the command streams (and accordingly operates in the manner of the technology described herein). Thus in an embodiment, the command stream generating circuit comprises a programmable processing circuit that can be programmed (e.g. and in an embodiment to operate as a driver for the processing resource) to prepare the command streams in the desired manner.

In embodiments where the host processor is configured to also generate indicators of command stream generation work to be performed by the processing resource, the indicators (e.g. command "templates") can be generated at the same time, in an embodiment by the same element of the host processor, e.g., and in an embodiment, the same command stream generating circuit operating as a driver for the processing resource.

Once the command stream (layout) has been prepared by the host processor, the command stream is provided to the processing resource, e.g. graphics processor, for execution, and the processing resource, e.g. graphics processor, will then execute the command stream appropriately.

The command stream layout can be provided to the processing resource, e.g. graphics processor, in any suitable and desired manner.

The command stream layout, once provided to the processing resource, is then used to build a command stream. The resulting command stream is initially stored by the processing resource in appropriate command stream storage, in the form of a 'command stream buffer', from where the commands can be read appropriately by the processing resource for execution. The command stream buffer may take any suitable form, as desired. In embodiments it comprises a ring buffer.

As described above, as part of the initial building and storing of the command stream, the processing resource is in an embodiment triggered to perform the required command stream generation work to populate the command stream for execution.

It will be appreciated in this respect that the processing resource may start executing commands in the command stream before the command stream is fully populated. That is, the steps of the command stream generation work performed by the host processor to populate the command stream may be, and in an embodiment are, performed in parallel with the execution of the command stream.

The execution of the command stream by the processing resource can be configured and implemented in any suitable and desired manner. For example, the processing resource may include an appropriate supervising controller, such as a microcontroller (MCU), that is operable to handle the scheduling of the command streams on the hardware execution resources of the processing resource (and in an embodiment, this is the case). Other arrangements would, of course, be possible.

Correspondingly, in an embodiment, hardware execution resources of the processing resource include one or more, and in an embodiment a plurality of, command stream execution units operable to execute (and that execute) commands in a command stream so as to perform processing tasks for an application.

The processing resource, e.g. graphics processor, can correspondingly execute the command stream in any suitable and desired manner. For example, the execution of plural command streams (where provided) is in an embodiment started simultaneously, with the processing resource, e.g. graphics processor, then processing the commands in each command stream appropriately in turn (and in parallel where the processing resource has the capability to do that and that is appropriate) (and in accordance with and on the basis of any wait commands that are included in a command stream).

Thus, in an embodiment, the processing resource will execute commands in the command streams in turn (and in order), and as it does so will, for a (and for each) command stream that it is executing, track its progress through (along)

the command stream (the position that it has currently reached in the command stream), for example, and in an embodiment, by maintaining a progress count for the command stream that is (in an embodiment) automatically incremented when command stream commands that are to increment the progress counter are executed. The current command stream position (progress count) could, e.g., be maintained in an appropriate register of or accessible to the processing resource.

The technology described herein can be used for all forms of output that a processing resource of a data processing system may be used to generate. For example, in the case of graphics processing, the graphics processor may generate frames for display, render-to-texture outputs, etc. The graphics processor may however also be used for general purpose graphics processing. The output data values from the processing are in an embodiment exported to external, e.g. main, memory, for storage and use, such as, in the case of graphics processing, to a frame buffer for a display.

In some embodiments, the data processing system comprises, and/or is in communication with, one or more memories and/or memory devices that store the data described herein, and/or store software for performing the processes described herein. The data processing system may also comprise or be in communication with a display for displaying images based on the data generated by the data processing system.

The technology described herein is applicable to any suitable form or configuration of processor or data processing system. In an embodiment, the various functions of the technology described herein are carried out on a single data processing platform that generates and outputs data. However, the technology described herein may also find utility in cloud-based systems, for example where the host processor resides in the cloud and controls a local processing resource (e.g. a local display). Various arrangements would be possible in this regard.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, circuits/circuitry of the technology described herein may comprise a suitable processor or processors, controller or controllers, functional units, circuits/circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Subject to any hardware necessary to carry out the specific functions discussed above, the data processing system can otherwise include any one or more or all of the usual functional units, etc., that data processing systems include.

It will also be appreciated by those skilled in the art that all of the described aspects and embodiments of the technology described herein can, and in an embodiment do, include, as appropriate, any one or more or all of the optional features according to embodiments described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that the techniques for submitting processing tasks to a processing resource described herein can be used in non-graphics contexts as well.

FIG. 1 shows an exemplary graphics processing system. An application 2, such as a game, executing on a host processor 1 will require graphics processing operations to be performed by an associated graphics processing unit (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

In the present embodiments, the appropriate commands and data for performing the processing tasks required by the application 2 are provided to the graphics processor 3 in the form of one or more command streams, that each include sequences of commands (instructions) to cause the graphics processor to perform desired processing tasks.

The overall preparation of the command streams is performed by the driver 4 on the host processor 1 and the command streams may, for example, be stored in appropriate command stream buffers, from where they can then be read by the graphics processor 3 for execution. Each command stream will contain commands (instructions) to set parameters for graphics processor tasks, as well as commands (instructions) to execute a task, etc.

Figure 2:
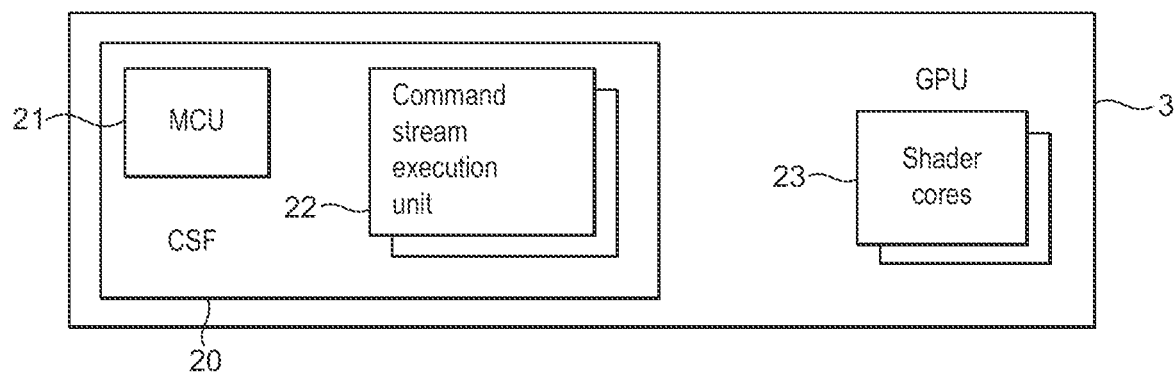
FIG. 2 shows schematically a graphics processor that can be operated in the manner of the technology described herein.

In order to facilitate this operation, the graphics processor 3 includes, as shown in FIG. 2, a command stream frontend 20 that includes a command stream supervisor (controller) 21 (in the form of a microcontroller) that is operable to schedule and issue commands from the command streams to respective command stream execution units 22. The command stream execution units 22 then execute the commands in the respective command streams to trigger the processing execution units 23 of the graphics processor (which in the present example are shown as being a plurality of shader cores, although other arrangements would, of course, be possible) to perform the desired processing tasks.

Figure 3:
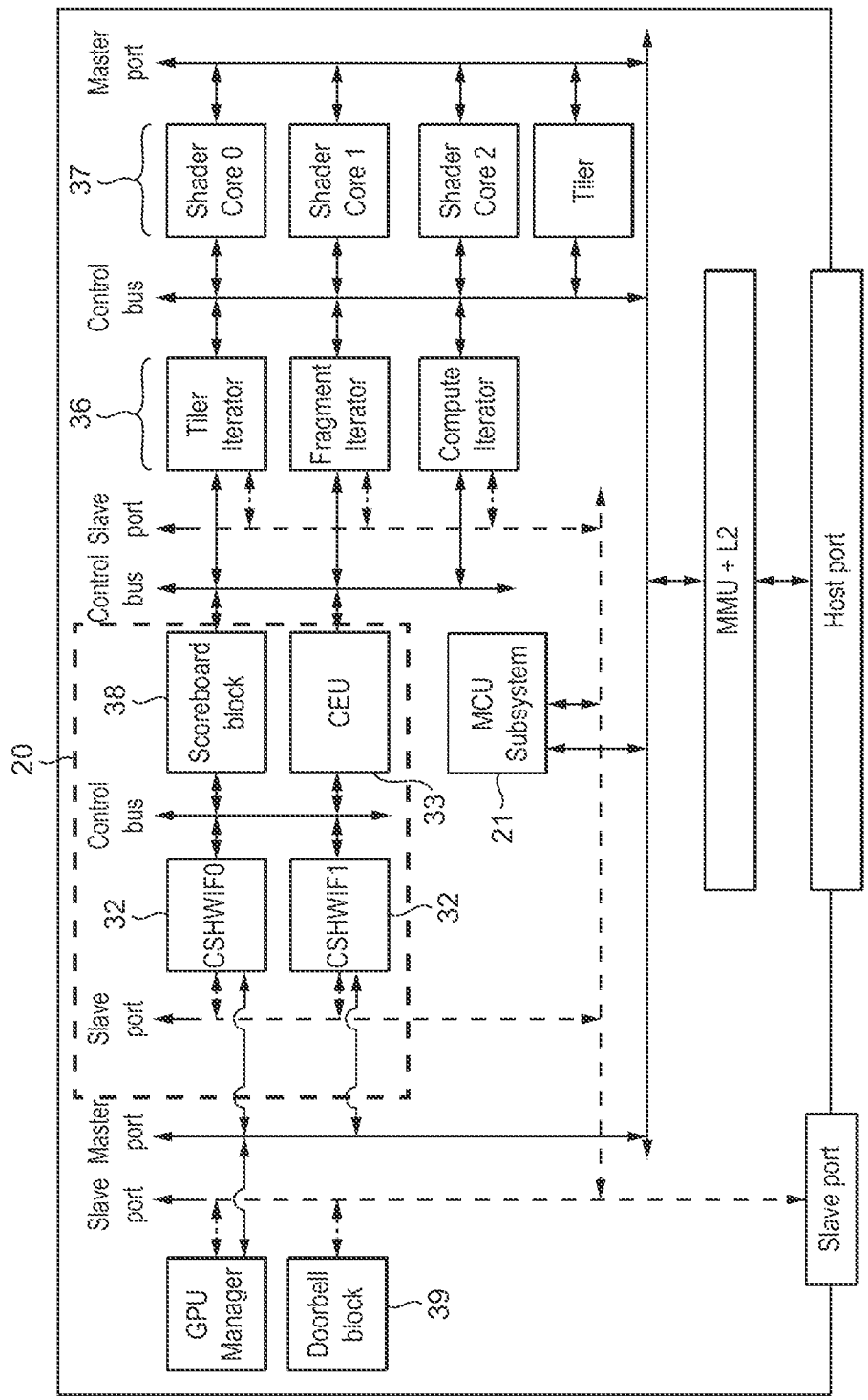
FIG. 3 shows schematically in more detail a graphics processor including a command stream frontend.

FIG. 3 shows in more detail the graphics processor 3 including the command stream frontend 20. The supervisor (controller) 21 (in the form of a microcontroller) handles communications with the host processor 1, and schedules the processing of active command streams on the command stream frontend 20.

The command stream frontend 20, which may be implemented as a single (hardware) functional unit, generally comprises one or more command stream interfaces 32 and a (shared) command stream execution unit 33. Each command stream interface 32 has an associated command buffer containing a set of active instructions to be processed, as well as a registry and local memory for storing the internal state (parameters) for the processing. The command buffer is contained in system memory with the command stream interface containing its properties so it can obtain commands from it.

The instructions within the command buffer(s) are provided to the command stream execution unit 33 and then executed in turn (e.g. in a round robin fashion where multiple command stream interfaces 32 are provided). The command stream execution unit 33 thus executes the commands in turn, with the instructions either being emulated in software by the supervisor (controller) 21, or assigned to the accelerator hardware, e.g. depending on the type of instruction.

(In general when the command stream execution unit 33 executes an instruction, it will either perform the operation synchronously itself (e.g. a move operation), or it will "package up" a request and send it to the GPU hardware units in the case of (e.g. a run command), or it will inform the supervisor (controller) 21, which may then emulate the command in software.)

The command stream frontend 20 also includes a scoreboard block 38 that is able to independently track the processing job completion for each of the command steam interfaces 32. The scoreboard block 38 is thus a shared resource. The scoreboard block 38 tracks the progress of the processing tasks associated with each processing job and reports this back.

As shown in FIG. 3, the graphics processor 3 includes a number of hardware units, such as a plurality of iterators 36 (here, separate tiler, fragment and compute iterators are provided, although other arrangements would of course be possible) and processing (e.g. shader) cores 37.

A processing job specified in a command being executed by the command stream execution unit 33 can thus be assigned and sent to a respective iterator 36, along with the current parameters held within the registry and local memory. The iterator 36 acts to break down the processing job into a set of processing tasks which can then be distributed between the processing cores 37 for processing.

The host processor 1 communicates with the supervisor (controller) 21 of the graphics processor 3 via a shared interface memory (which may be main memory, or another suitable memory cache, depending on the configuration). Thus, when an application 2 running on the host processor 1 makes a call for processing by the graphics processor 3, the host processor 1 can communicate with the supervisor (controller) 21 of the graphics processor 3 via the shared memory, and the supervisor (controller) 21 can then read the data in from the shared memory. For instance, the host processor 1 can write to a doorbell block 39 to interrupt the current operation of the supervisor (controller) 21 and cause the supervisor (controller) 21 to handle new work.

Once the supervisor (controller) 21 receives a request from the host processor 1 to execute a command stream, the supervisor (controller) 21 can then assign a respective command stream interface 32 for the command stream, and the command stream can then be loaded into a command buffer for the assigned interface (and the command stream properties written to the assigned interface). The commands are then passed in order from the command buffer to the command stream execution unit 33 which interprets the commands from the command buffers, and executes the commands using the local memory and registry information associated with that command stream interface and buffer.

When a command is executed by the command stream execution unit 33, depending on the type of instruction, the instruction may then be performed either in hardware (e.g. by the command stream execution unit 33 itself, or using the iterators 36 and shader cores 37), or may be emulated by the supervisor (controller) 21. For instance, any commands e.g. for updating the local memory and registry information may typically be implemented by the command stream execution unit 33 itself in order to set the parameters for a processing job. The processing job may then be sent to the GPU hardware unit(s) for processing, along with these parameters.

The above description describes the execution of command streams by the graphics processor 3.

In more conventional graphics processing systems, the command streams are prepared in full by the host processor 1 and then provided to the graphics processor 3 for execution.

Thus, in more conventional systems, the driver 4 on the host processor 1 side builds the full command stream and submits the assembled command stream to the command stream frontend 20 on the graphics processor 3 side for execution. The traditional approach needs to prebuild all the command streams on the host processor side 1, as there is no support for the graphics processor 3 to perform any of the command stream assembly itself.

The present Applicants have however recognised that the traditional approach based on the host processor 1 generating and assembling the command streams for the graphics processor 3 can introduce significant rendering latency, as well as increased processing load at the host processor 1, increased host processor-graphics processor traffic, and higher memory bandwidth.

To address this, the technology described herein provides a novel approach where the command streams are at least partly assembled by the processing resource (e.g. the graphics processor 3) itself, during run-time. This can therefore reduce latency and provide an overall more efficient command stream generation.

The present embodiments are particularly concerned with the situation where the command stream generation uses sensor data from external sensors. For example, the graphics processing system may comprise part of a virtual reality (VR) or augmented reality (AR) head mounted display (HMD) system.

Figure 4:
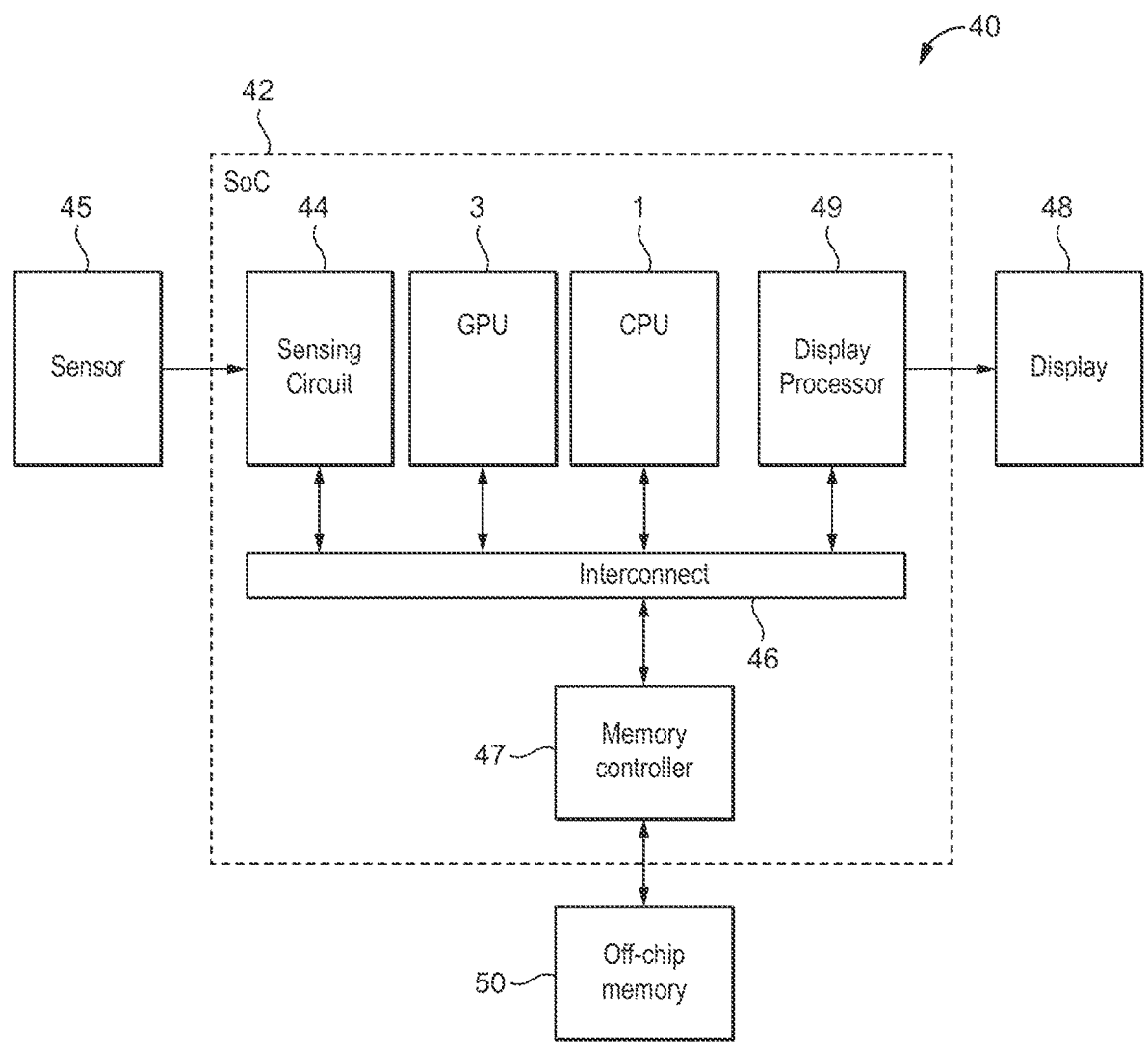
FIG. 4 shows further details of a graphics processing system according to an embodiment.

An example of such head mounted display (HMD) system 40 is shown in FIG. 4. In this case, the display 48 will be a head-mounted display of some kind.

In head mounted display operation, appropriate frames (images) to be displayed on each eye will be rendered by the graphics processor (graphics processing unit (GPU)) 3 in response to appropriate commands and data from the application (e.g. executing on the main (e.g. host) processor (CPU)) 1 that requires the display. The resulting frames are then displayed accordingly on the display 48, e.g. under the control of an appropriate display processor 49.

As shown in FIG. 4, the graphics processor 3, host processor 1 and display processor 48 are thus provided as part of a single system on chip 42, and operable to communicate with each other via an appropriate interconnect 46. In the system shown in FIG. 4, this same interconnect 46 also controls communication with off-chip memory 50, e.g. via a suitable memory controller 47

In such arrangements, the system 40 will also operate to track the movement of the head/gaze of the user (so-called head pose (orientation) tracking). This head orientation (pose) data is then used to determine how the images should actually be displayed to the user for their current head position (view orientation (pose)), and the images (frames) are rendered accordingly (for example by setting the camera orientation (viewpoint and view direction) based on the head orientation data), so that an appropriate image (frame) based on the user's current direction of view can be displayed.

Various other examples of sensors may be used to inform the display, such as motion sensors, gravity sensors, ambient lighting sensors, etc.

A sensing circuit 44 is thus also provided that is operable to obtain any such sensor data from external sensors 45 and provide the obtained sensor data via the interconnect 46 to the rest of the system 40 appropriately.

In traditional command stream based systems, where the command stream generation is performed in full at the host processor 1, the sensor data would thus be provided along the interconnect 47 to the host processor 1, with the driver 4 on the host processor 1 side then preparing suitable commands based on the sensor data for inclusion into the command stream that is then provided to the graphics processor 3 for execution.

In the technology described herein, however, at least some of the command stream assembly, in particular including the obtaining and processing of such sensor data into suitable command stream data is performed by the graphics processor 3 at run-time. There are various ways this can be done according to embodiments of the technology described herein, e.g. as will be explained below.

Figure 5:
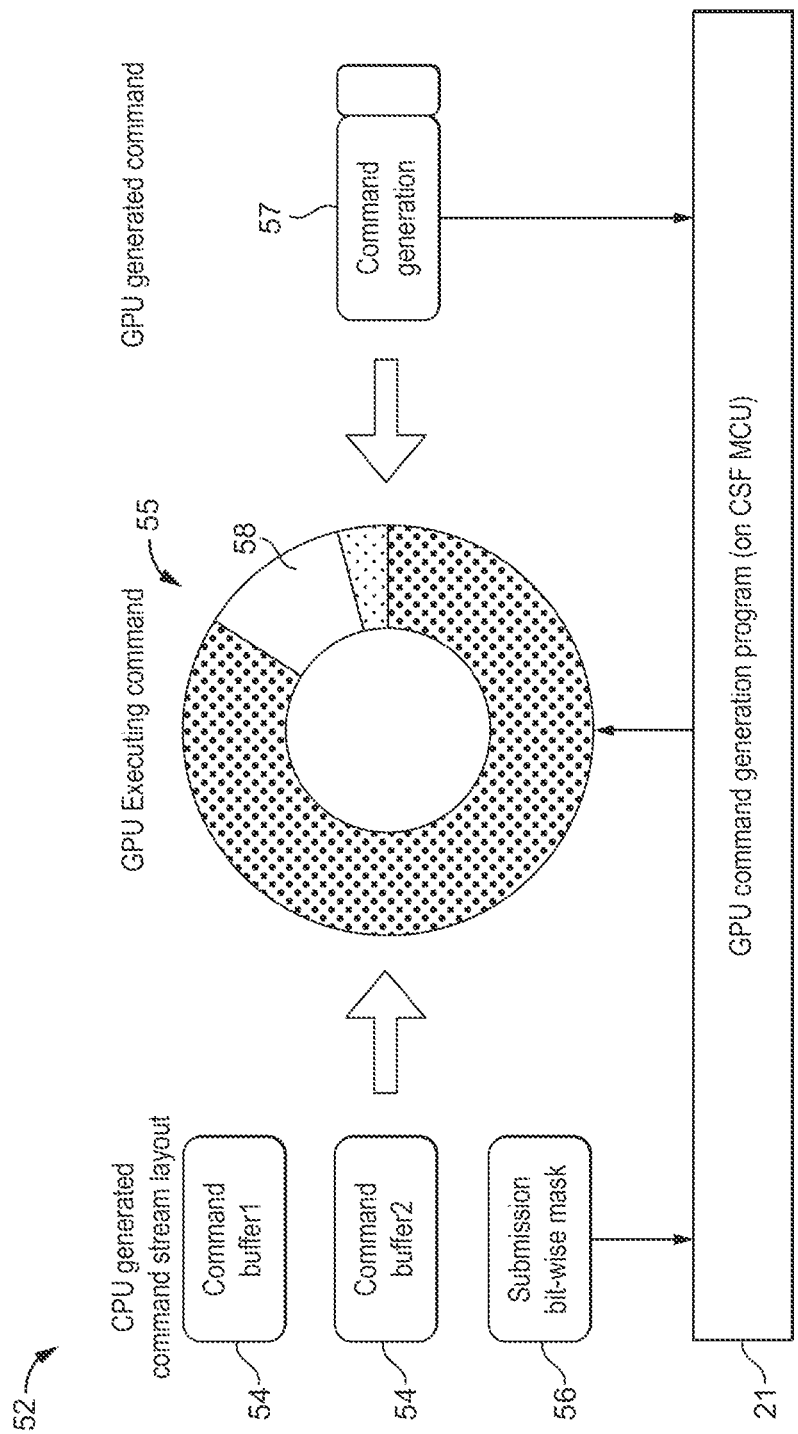
FIG. 5 shows schematically a first approach to command stream generation according to an embodiment.

An example embodiment will be described in relation to FIG. 5. As shown in FIG. 5, the driver 4 on the host processor 1 side generates a command stream layout 52 that includes, as well as a number of full commands 54 (prepared in the normal way by the host processor 1), a submission bitwise mask 56 that is used as an indicator for causing the graphics processor 3 to perform command stream generation work. In this case, the submission bitwise mask 56 may be provided to the command stream supervisor (controller) 21 and used to identify instances where an executable command should be generated by the graphics processor 3 and included into the command stream corresponding to the command stream layout 52. This is illustrated in more detail in FIG. 6 which shows an example of the use of a bitwise mask 56 to indicate which commands in the sequence of commands indicated by the command stream layout 52 need to be generated by the graphics processor 3. Thus, in the example shown in FIG. 6, the fourth bit value (bit3) is set, to indicate that the fourth command in the sequence of commands indicated by the command stream layout 52 needs to be generated by the graphics processor.

Figure 6:
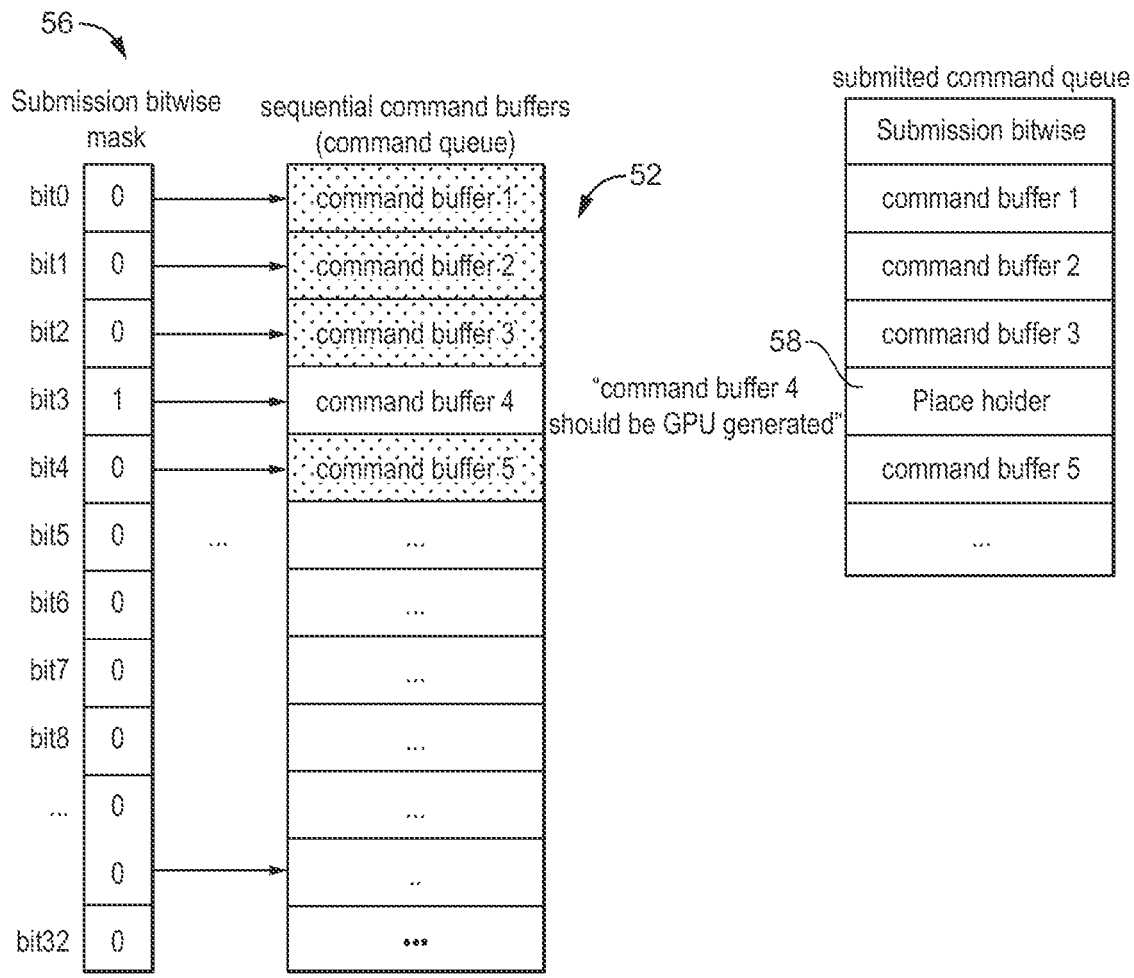
FIG. 6 shows a bitwise mask that may be used according to the FIG. 5 embodiment.

The command stream layout 52 is thus provided to the graphics processor 3 accordingly, together with the bitwise mask 56 indicating where command stream generation is required in respect of the commands indicated by the command stream layout 52. When the command stream corresponding to the command stream layout 52 is being stored in the command stream ring buffer 55, a suitable placeholder command 58 is thus included in the command stream at the position indicated in the command stream layout 52 (as shown in FIG. 6).

The command stream supervisor (controller) 21 then performs the required command stream generation work, e.g., and in an embodiment, by executing an appropriate pre-set shader program to process the sensor data into command stream data, and the resulting command 57 generated by the graphics processor 3 is then written into the command stream ring buffer 55 at the appropriate position of the placeholder command 58.

The submission bitwise mask 56 has bit values that can be set to indicate that a particular command indicated in the command stream layout needs to be generated by the graphics processor 3, and hence to cause the graphics processor 3 to perform appropriate command stream generation work. The submission bitwise mask 56 is thus generated at the host processor 1 side and then provided to the graphics processor 3 appropriately to trigger the generation of suitable command stream data for inclusion into the full command stream.

There are various ways the bitwise mask may be provided to the graphics processor 3 to trigger the command stream generation work. For example, in FIG. 5, the bitwise mask 56 may be provided directly to the command stream frontend 20, separately to the command stream layout 52. However, the bitwise mask 56 could also be provided as part of the command stream layout 52 itself.

Figure 7:
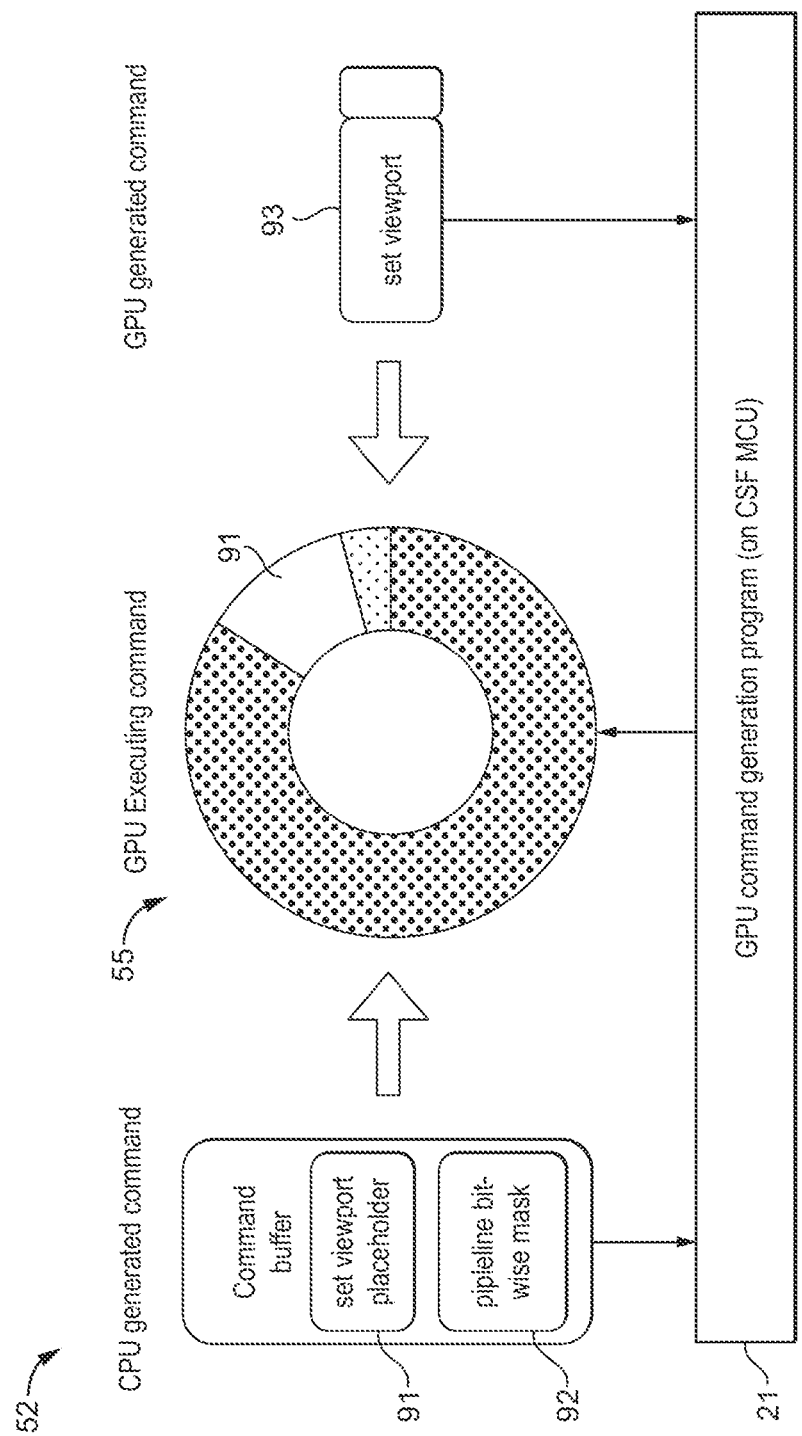
FIG. 7 shows schematically another approach to command stream generation according to a further embodiment.
Figure 8:
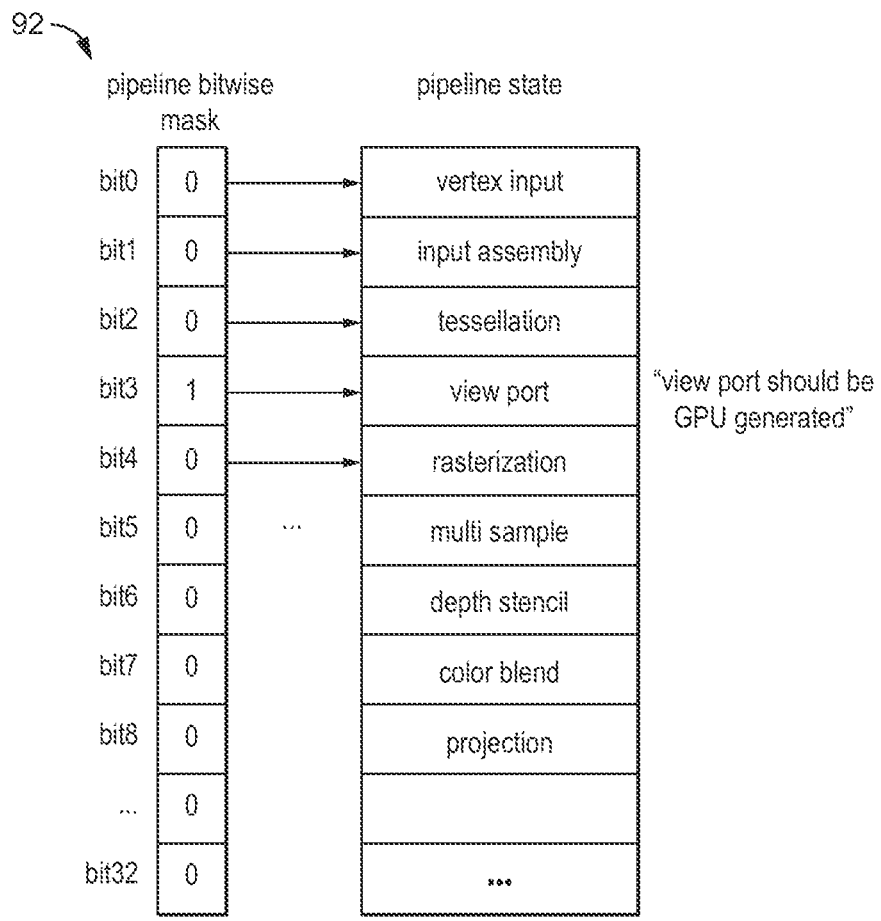
FIG. 8 shows a bitwise mask that may be used according to the FIG. 7 embodiment.

FIG. 7 shows another example where a bitwise mask 92 is used to cause the graphics processor 3 to generate an executable command. In this case, the bitwise mask 92 is included within the command stream layout 52, together with a placeholder command 91. The command stream layout 52 is thus provided to the graphics processor 3, and the graphics processor 3 is caused to store a corresponding command stream in its command stream ring buffer 55, including an empty command at the position of the placeholder command 91, in a similar manner as described above. In this example, the bitwise mask 92 is used to indicate the type of command that is to be generated, as shown in FIG. 8.

The bit values are thus set accordingly to trigger the graphics processor 3 to perform one or more types of command generation work. In the example shown in FIG. 8, for instance, the fourth bit (bit3) is set, to indicate that the set view port command should be generated by the graphics processor 3. The command stream supervisor (controller) 21 is thus caused to generate a set view port command 93 which is then written into the command stream ring buffer 55 appropriately at the position of the corresponding placeholder command 91, as indicated in the command stream layout 52.

Various other arrangements would be possible.

Figure 9:
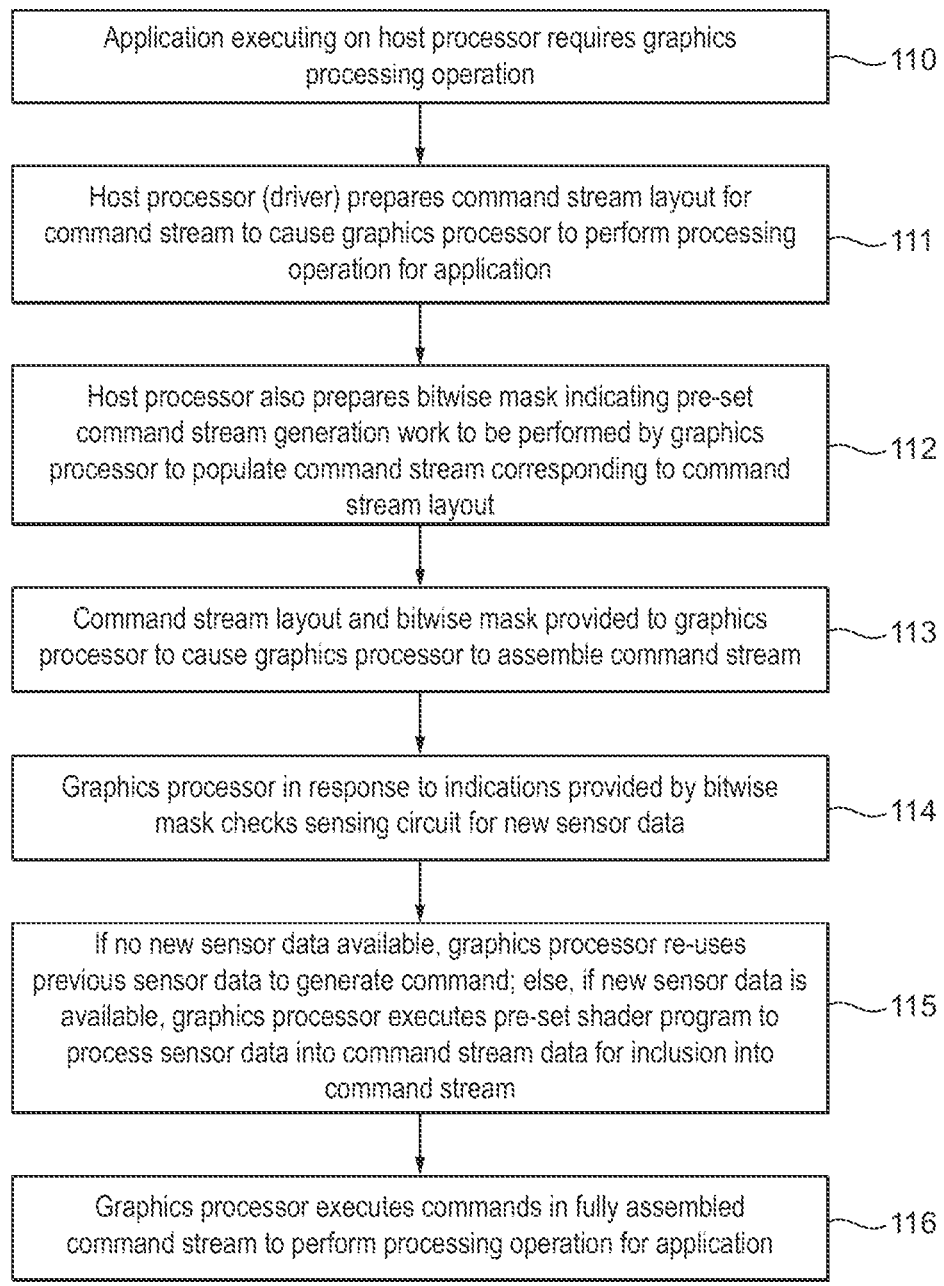
FIG. 9 is a flow chart illustrating the overall method according to an embodiment.

FIG. 9 is a flow chart illustrating the overall operation according to an embodiment of the technology described herein.

As shown in FIG. 9, when an application 2 executing on the host processor 1 requires graphics processing work to be performed by the graphics processor 3 (step 110), the driver 4 on the host processor 1 side prepares a command stream layout indicating a sequence of commands for a command stream for the graphics processor 3 accordingly (step 111). The sequence of commands indicated in the command stream layout may, and typically does, include at least some fully executable commands, e.g. that are prepared by the host processor 1, e.g. in the normal way. However, according to the technology described herein, the command stream layout also indicates some commands that are to be generated by the graphics processor 3. Thus, at the same time as preparing the command stream layout, the host processor 1 also generates one or more indicators of command stream generation work that is to be performed by the graphics processor 3 in order to populate the command stream corresponding to the command stream layout (step 112). These indicators may take any suitable form, as desired, but in the present embodiments in an embodiment comprise a bitwise mask, e.g. as described above.

The commands stream layout and bitwise mask are then provided to the graphics processor 3 (step 113). The graphics processor 3 is then configured to start storing a command stream corresponding to the command stream layout within the command stream buffer 55 for execution. As part of this, the graphics processor 3 is caused to check the sensing circuit for any sensor data that may be required in order to populate commands, e.g. as indicated by the bitwise mask (step 114).

The graphics processor 3 can then obtain any new sensor data and then execute an appropriate pre-set shader program to process the sensor data into command stream data for inclusion into the command stream (step 115). On the other hand, if there is no new sensor data available the graphics processor 3 can simply re-use the previous processing result in order to populate the command.

The graphics processor 3 can then (and does) execute the commands in the command stream corresponding to the command stream layout accordingly in order to perform the desired graphics processing operations for the application 2 executing on the host processor 1 (step 116).

Thus, in the present embodiment, the command stream that is executed (in step 116) is assembled at least in part by the graphics processor 3 itself.

Whilst a number of examples have been provided above, various other arrangements would of course be possible for causing the graphics processor 3 (or, generally, any other suitable processing resource of a data processing system) to perform some of the command stream generation work.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a data processing system that comprises:
    a host processor operable to execute applications of the data processing system; and
    a processing resource operable to perform data processing tasks for applications executing on the host processor;
    the method comprising:
    preparing on the host processor, in response to a request for data processing to be performed by the processing resource from an application, a command stream layout indicating a sequence of commands for a command stream to cause the processing resource to perform processing tasks for the application, wherein for at least some of the commands indicated in the command stream layout, sensor data is required in order to populate the command;
    the host processor providing the command stream layout to the processing resource; and
    the processing resource storing a command stream corresponding to the command stream layout within a command stream buffer for execution,
    wherein the processing resource storing a command stream corresponding to the command stream layout within the command stream buffer further comprises:
    in response to a command indicated in the command stream layout requiring sensor data:
    the processing resource:
    processing the sensor data into command stream data for inclusion into the command stream; and writing the command stream data into the command stream in the command stream buffer for execution by the processing resource;

the method further comprising:

the processing resource executing commands from within the command stream stored in the command stream buffer to perform processing tasks for the application.

2. The method of claim 1, comprising the host processor, when preparing the command stream layout, also generating one or more indicators of command stream generation work that is to be performed by the processing resource to populate the command stream corresponding to the command stream layout, which indicators will trigger the processing resource to perform command stream generation work including the steps of obtaining and processed sensor data to generate command stream data for inclusion into the command stream corresponding to the command stream layout.

3. The method of claim 2, wherein the indicator of command stream generation work comprises a bitwise mask with the bit values in the mask being set to indicate which commands in the sequence of commands indicated by the command stream layout require sensor data.

4. The method of claim 2, wherein the indicator of command stream generation work comprises a bitwise mask with the bit values in the mask being set to cause the processing resource to perform one or more pre-set processing tasks, wherein the bitwise mask is associated with a command indicated in the command stream layout.

5. The method of claim 1, wherein the processing resource comprises a programmable execution unit that is operable to execute shader programs and wherein processing the obtained sensor data into command stream generate comprises the processing resource executing a shader program for processing the obtained sensor data into command stream generate.

6. The method of claim 1, wherein the sensor data is data relating to a user of the application executing on the host processor.

7. The method of claim 1, wherein the processing resource comprises a graphics processor, and wherein the processing tasks to be performed by the graphics processor for the application executing on the host processor are graphics processing tasks, and wherein the processing of the sensor data by the processing resource generates executable commands for storing in the command stream buffer that when executed by the graphics processor will cause the graphics processor to perform a graphics processing task.

8. A method of operating a processing resource, the processing resource being operable to perform processing tasks for applications executing on a host processor of the data processing system;

the method comprising:

the processing resource receiving a command stream layout indicating a sequence of commands for a command stream to cause the processing resource to perform processing tasks;

the processing resource storing a command stream corresponding to the command stream layout within a command stream buffer for execution, wherein for at least some of the commands indicated in the command stream layout, sensor data is required in order to populate the command, and wherein the processing resource storing a command stream corresponding to the command stream layout within the command stream buffer further comprises:

in response to a command indicated in the command stream layout requiring sensor data:

the processing resource:

processing the sensor data into command stream data for inclusion into the command stream; and writing the command stream data into the command stream in the command stream buffer for execution;

the method further comprising:

the processing resource executing commands from within the command stream stored in the command stream buffer to perform the processing tasks to which the command stream relates.

9. A processing resource for a data processing system, wherein the processing resource is operable to perform processing tasks for applications executing on a host processor of a data processing system, and comprises:

a command stream buffer for storing command streams corresponding to the command stream layouts received by the processing resource;

a command stream execution circuit configured to execute commands from within the command stream buffer to perform processing tasks; and a processing circuit configured to, when storing a command stream corresponding to a command stream layout received by the processing resource in the command stream buffer, in response to a command indicated in the command stream layout requiring sensor data:

process the sensor data into command stream data for inclusion into the command stream; and write the command stream data into the command stream in the command stream buffer for execution by the command stream execution circuit.

10. The processing resource of claim 9, comprising a programmable execution unit that is operable to execute shader programs and wherein processing the obtained sensor data into command stream generate comprises the processing resource executing a shader program for processing the obtained sensor data into command stream data.

11. The processing resource of claim 9, wherein the sensor data is data relating to a user of the application executing on the host processor.

12. The processing resource of claim 9, wherein the processing resource comprises a graphics processor, and wherein the processing tasks to be performed by the graphics processor for the application executing on the host processor are graphics processing tasks, and wherein the processing of the sensor data by the processing resource generates executable commands for storing in the command stream buffer that when executed by the graphics processor will cause the graphics processor to perform a graphics processing task.

13. The processing resource of claim 9, wherein the processing resource is configured perform one or more pre-set processing tasks for obtaining and processing sensor data into corresponding command stream data for inclusion into the command stream.

14. A data processing system comprising the processing resource of claim 9, the data processing system further comprising:

a host processor operable to execute applications of the data processing system;

wherein the processing resource is operable to perform data processing tasks for applications executing on the host processor; and wherein the host processor comprises:

a command stream preparation circuit that is configured to prepare, in response to a request for data processing to be performed by the processing resource from an application, a command stream layout indicating a sequence of commands for a command stream to cause the processing resource to perform processing tasks for the application, wherein for at least some of the commands indicated in the command stream layout, sensor data is required in order to populate the command;

a processing circuit configured to provide prepared command stream layouts to the processing resource.

15. The system of claim 14, wherein the host processor is configured, when preparing the command stream layout, to also generate one or more indicators of command stream generation work that is to be performed by the processing resource to populate the command stream corresponding to the command stream layout, which indicators will trigger the processing resource to perform command stream generation work including the steps of obtaining and processed sensor data to generate command stream data for inclusion into the command stream corresponding to the command stream layout.

16. The system of claim 15, wherein the indicator of command stream generation work comprises a bitwise mask with the bit values in the mask being set to indicate which commands in the sequence of commands indicated by the command stream layout require sensor data.

17. The system of claim 15, wherein the indicator of command stream generation work comprises a bitwise mask with the bit values in the mask being set to cause the processing resource to perform one or more pre-set processing tasks, wherein the bitwise mask is associated with a command indicated in the command stream layout.

* * * * *